US007424706B2

(12) United States Patent
Ivanov et al.

(10) Patent No.: US 7,424,706 B2
(45) Date of Patent: Sep. 9, 2008

(54) AUTOMATIC DETECTION AND PATCHING OF VULNERABLE FILES

(75) Inventors: Oleg Ivanov, Issaquah, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 10/621,148

(22) Filed: Jul. 16, 2003

(65) Prior Publication Data

US 2005/0015760 A1 Jan. 20, 2005

(51) Int. Cl.
G06F 9/44 (2006.01)
G06F 7/04 (2006.01)
G08B 23/00 (2006.01)

(52) U.S. Cl. ............... 717/169; 717/124; 717/126; 717/171; 713/176; 713/177; 713/180; 726/25; 726/26

(58) Field of Classification Search ......... 717/178–168; 714/38
See application file for complete search history.

(56) References Cited

U.S. PATENT DOCUMENTS

| | | | | |
|---|---|---|---|---|
| 5,231,668 | A * | 7/1993 | Kravitz | 380/28 |
| 5,675,711 | A | 10/1997 | Kephart et al. | |
| 5,907,834 | A | 5/1999 | Kephart et al. | |
| 5,930,504 | A * | 7/1999 | Gabel | 713/2 |
| 6,016,546 | A | 1/2000 | Kephart et al. | |
| 6,199,204 | B1 * | 3/2001 | Donohue | 717/178 |
| 6,425,126 | B1 | 7/2002 | Branson et al. | |
| 6,493,871 | B1 | 12/2002 | McGuire et al. | |
| 7,000,247 | B2 * | 2/2006 | Banzhof | 726/2 |

2003/0126472 A1 7/2003 Banzhof

FOREIGN PATENT DOCUMENTS

| | | |
|---|---|---|
| EP | 1505499 | 2/2005 |
| GB | 2381721 | 5/2003 |
| WO | WO99/56196 | 4/1999 |

OTHER PUBLICATIONS

Liu, et al; "Automated Security Checking and Patching Using TestTalk"; 2000 IEEE; pp. 261-264.
Brykczynski, et al.; "Reducing Internet-Based Intrusions: Rffective Security Patch Management"; Jan./Feb. 2003; IEEE Software; 8 pages.
Lyndon, et al; "24-Hour Anti-Virus Service"; Virus Bulletin Oct. 2002; Virus Bulletin Ltd, The Pentagon Abingdon, Oxfordshire, OX14 3YP, England; 2 pages.
"How does it work—an antivirus"; IT-Expert; No. 37; pp. 37-40; May-Jun. 2002.

* cited by examiner

Primary Examiner—Chuck O Kendall
(74) Attorney, Agent, or Firm—Lee & Hayes, PLLC

(57) ABSTRACT

Systems and methods are described that enable patching of security vulnerabilities in binary files. The detection and patching of vulnerable binary files is automatic, reliable, regression free, and comprehensive across networks on an unlimited scale. These advantages can be realized in various ways including, for example, by leveraging current anti-virus infrastructure that is widely deployed across the Internet. Reliable discovery of vulnerable binary files (e.g., in operating systems, application programs, etc.) is achieved through the use of binary signatures that have been associated with discovered security vulnerabilities. A divergence of security patches away from conventional service packs provides for the possibility of production of regression-free fixes for security vulnerabilities in binary files.

24 Claims, 5 Drawing Sheets

AUTOMATIC DETECTION AND PATCHING OF VULNERABLE FILES

TECHNICAL FIELD

The present disclosure generally relates to patching files, and more particularly, to an automatic, comprehensive, reliable and regression-free way of providing security patches for vulnerable binary program files in distributed, heterogeneous computing environments.

BACKGROUND

Software development is an ongoing process whereby a software product initially released to the public can be continually updated through revisions from a software developer/vendor. Software revisions are typically disbursed from a software vendor in what are called "service packs" that can be downloaded or ordered from a vendor for installation on a user's computer. Service packs typically contain program fixes (e.g., for an operating system, application program, etc.) that repair problems (i.e., "bugs") discovered in the program code after the initial release of the product or after the last service pack release.

In addition to containing fixes for program bugs, service packs can also contain security patches developed specifically to repair vulnerabilities found in program files. Program vulnerabilities discovered after a software product is released can pose significant security threat of attack from hackers and viruses on a world-wide basis. Therefore, once a vulnerability is discovered, the prompt and wide-spread distribution and installation of security patches to computers having vulnerable software is of paramount importance. Theoretically, the use of service packs to achieve such prompt and wide-spread distribution of security patches could be effective. For example, when a software vendor discovers a vulnerability and then develops a security patch, the patch can be posted in the latest service pack on a vendor Web site for users to immediately download and install. This could thwart most hackers and viruses that are intent on exploiting the discovered vulnerability. However, system administrators and other software product users currently face several drawbacks and/or difficulties related to accessing and installing security patches. These difficulties typically result in a significantly lower distribution of such patches than is intended by the vendor who develops the patch. The result is that vulnerabilities on many computers world-wide are left un-patched, exposing such computers to significant risk.

One difficulty with accessing and installing security patches is that current methods for detecting whether a computer is running software with a known vulnerability require the active use and involvement of the computer. For example, currently available methods can determine whether particular versions of software products on a computer are in need of being updated (e.g, with a security patch). However, only those software products actively running on the computer are included in this determination. Secondary operating systems and applications that are not actively running on a computer are not considered, and therefore may have a security vulnerability that goes un-noticed and un-fixed. For those products actively running on a computer, a user can review a list of available updates and select updates for installation. Some updates may be critical updates designed to protect a computer from known security vulnerabilities. Various updates require a user to restart the computer before the installation is complete. In addition, a user must actively select the updates and install them. For these and other reasons, current methods for accessing and installing security patches are less than effective.

Another difficulty in accessing and installing security patches is that of knowing whether or not a security patch is needed on a computer. It is sometimes difficult for users to know if their computers are running software that is vulnerable. Furthermore, current methods for detecting whether a computer is running software with a known vulnerability may not be able to detect certain configurations of a software product known to be vulnerable. For example, shared versions of some software products can be distributed as part of other products. Thus, although a shared version of a product may contain the same vulnerability as the full version of the product, the shared version may not be recognized as a product that needs a security patch update. Thus, shared versions of software products that are known to have security vulnerabilities often go un-fixed.

Other problems with accessing and installing security patches relate to the conventional "service pack" method by which such patches are delivered. Downloading and installing services packs is a time intensive and manual process that many system administrators simply do not have time to perform. Therefore, even when administrators intend to install security patches, the time between the release of a security patch and its installation on a given system can be weeks, months, or years. Thus, the risk of attack through a security vulnerability may not be alleviated in such systems until long after the software vendor has issued a security patch.

Furthermore, system administrators often choose not to download and install service packs containing security patches, even though they understand the relevant security risks. The reason for this is that the installation of a service pack itself brings the risk of system regressions that can introduce unwanted changes in system behavior. Administrators often devote significant time and effort toward debugging a system so that it functions as desired. As mentioned above, however, service packs represent an evolution of a previous version of a software product that includes the most recent updates to a product's code base (i.e., the scope of changes is not restricted to security patches only). In addition to introducing new and intended behaviors into a system, recent code updates in a service pack may introduce unknown bugs into a system that can cause the system to behave unexpectedly, which, in turn, can create significant problems for a system administrator. Thus, systems frequently are not updated with important security patches intended to fix vulnerable program files, because administrators do not want to risk regressions.

Accordingly, a need exists for a way to implement patching of security vulnerabilities in program file in an automatic, comprehensive, reliable and regression-free manner.

SUMMARY

Automatic, comprehensive, reliable and regression-free security patching of binary program files is described herein.

In accordance with one implementation, a binary signature of a vulnerability and a security patch are received. A vulnerable binary file is identified on a computer based on the binary signature of a vulnerability. The vulnerable binary file on the computer is updated with the security patch.

In accordance with another implementation, a binary signature is received that identifies a security vulnerability in a binary file. A security patch configured to fix the security vulnerability is also received. The binary signature and the security patch are distributed to a plurality of servers.

In accordance with another implementation, a binary signature is received from a server and used to search binary files. A request for a security patch is sent to the server if the binary signature is found in a binary file. The binary file is then updated with the security patch.

BRIEF DESCRIPTION OF THE DRAWINGS

The same reference numerals are used throughout the drawings to reference like components and features.

DETAILED DESCRIPTION

Overview

The following discussion is directed to systems and methods that enable patching of security vulnerabilities in binary files. The detection and patching of vulnerable binary files is automatic, reliable, regression free, and comprehensive across networks on an unlimited scale. These advantages can be realized in various ways including, for example, by leveraging current anti-virus infrastructure that is widely deployed across the Internet. A divergence of security patches away from conventional service packs provides for the possibility of production of regression-free fixes for security vulnerabilities in binary files.

Reliable discovery of vulnerable binary files (e.g., in operating systems, application programs, etc.) is achieved through the use of binary signatures that have been associated with security vulnerabilities. Binary signatures associated with security vulnerabilities in binary files, along with security patches developed to fix such security vulnerabilities, are uploaded to a central distribution server. The distribution server is configured to distribute the binary signatures and security patches on a wide-scale basis across various networks such as the Internet. Use of a central distribution server to update network servers (e.g., across the Internet) provides comprehensive and automatic patch coverage on an unlimited scale. Network servers receiving such updates can scan client computers within subordinate networks to locate vulnerable files according to binary signatures, and then update those computers found to have security vulnerable files using corresponding security patches that will fix the vulnerable files. Network servers can also communicate with client computers to transfer binary signatures and security patches to the computers so that the scanning and updating can be performed by the computers themselves. Multiple nested levels of subordinate networks may also exist.

Exemplary Environment

Figure 1:
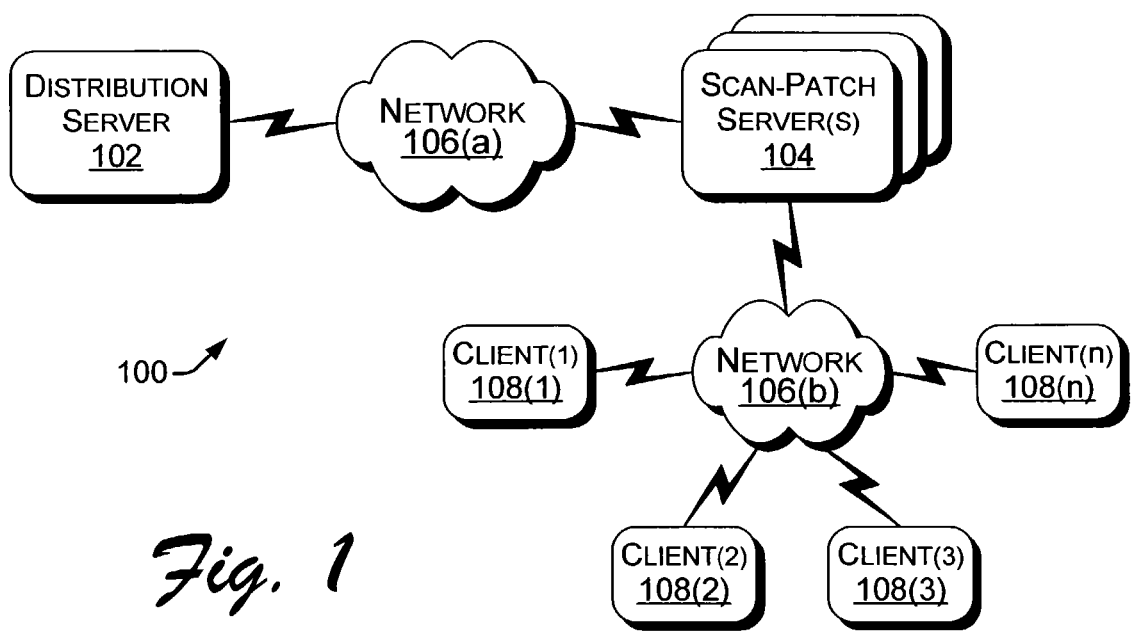
FIG. 1 illustrates an exemplary network environment suitable for implementing automatic detection and patching of security vulnerabilities in binary files.

FIG. 1 illustrates an exemplary network environment 100 suitable for implementing automatic detection and patching of security vulnerabilities in binary files. In the exemplary network environment 100, a central distribution server 102 is coupled to multiple scan/patch servers 104 via a network 106(a). A scan/patch server 104 is typically coupled through a network 106(b) to a plurality of client computers 108(1)-108(n). Network 106 is intended to represent any of a variety of conventional network topologies and types (including optical, wired and/or wireless networks), employing any of a variety of conventional network protocols (including public and/or proprietary protocols). Network 106 may include, for example, the Internet as well as possibly at least portions of one or more local area networks (LANs) and/or wide area networks (WANs). Networks 106(a) and 106(b) may be the same network such as the Internet, or they may be networks isolated from one another such as the Internet and a corporate LAN.

Distribution server 102 and scan/patch servers 104 are typically implemented as standard Web servers, and can each be any of a variety of conventional computing devices, including desktop PCs, notebook or portable computers, workstations, mainframe computers, Internet appliances, combinations thereof, and so on. One or more of the servers 102 and 104 can be the same types of devices, or alternatively different types of devices. An exemplary computing environment for implementing a distribution server 102 and a scan/patch server 104 is described in more detail herein below with reference to FIG. 7.

Client computers 108 function in a typical client/server relationship with a server 104 wherein multiple clients 108 make requests to a server 104 that services the requests. Client computers 108 can be any of a variety of conventional computing devices, including desktop PCs, notebook or portable computers, workstations, mainframe computers, gaming consoles, handheld PCs, cellular telephones or other wireless communications devices, personal digital assistants (PDAs), combinations thereof, and so on. One or more of the client computers 108 can be the same types of devices, or alternatively different types of devices. An exemplary computing environment for implementing a client computer 108 is described in more detail herein below with reference to FIG. 7.

In general, automatic and comprehensive detection and patching of vulnerable binary files client computers 108 is achieved through updates made through distribution server 102 that include binary signatures for identifying vulnerable binary files and security patches configured to fix vulnerable files. As discussed in greater detail below with respect to the following exemplary embodiments, the binary signatures and security patches are distributed to scan/patch servers 104 which in turn, either actively scan for and update vulnerable binary files on client computers 108, or push the binary signatures and security patches down to the client computers 108 so the client computers 108 can perform the scanning for and patching of vulnerable binary files.

EXEMPLARY EMBODIMENTS

Figure 2:
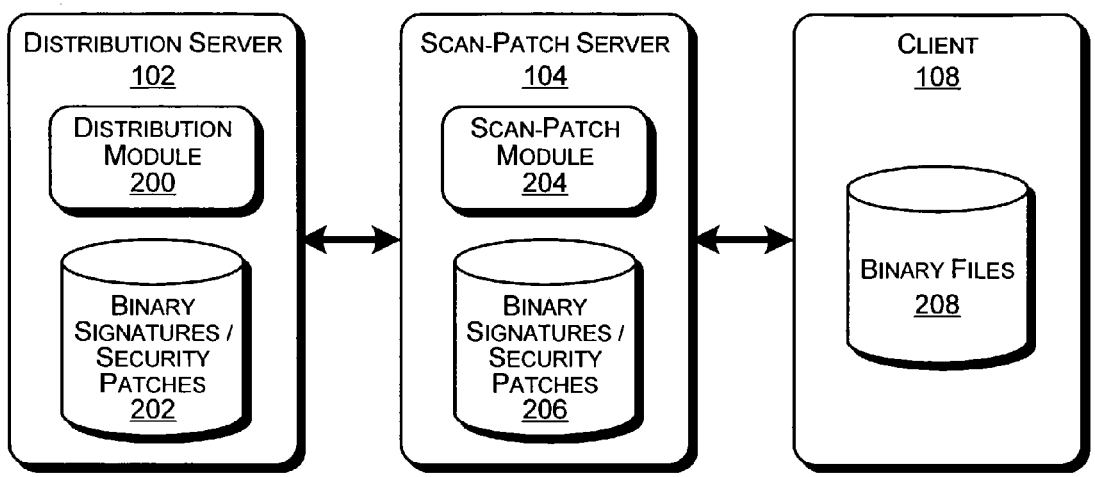
FIG. 2 illustrates an exemplary embodiment of a distribution server, a scan-patch server, and a client computer suitable for implementing automatic detection and patching of security vulnerabilities in binary files.

FIG. 2 illustrates an exemplary embodiment of a distribution server 102, a scan-patch server 104 and a client computer 108 suitable for implementing automatic detection and patching of security vulnerabilities in binary files. Distribution server 102 includes a distribution module 200 and a database 202 for receiving and holding binary signatures and security patches. Database 202 can be updated with binary signatures and security patches in a variety of ways including, for example, through a portable storage medium (not shown, but see FIG. 7) or through a computer device (not shown) coupled to the server 102 and configured to upload binary signatures and security patches to database 202.

A typical scenario in which a database 202 might be updated begins with an investigation of a software product (e.g., a operating system, application program, etc.) initiated by the developer of the software product. For example, a developer may hire a security consultancy firm to attempt to find security vulnerabilities in a newly released software product. If a security vulnerability is discovered in a software product through hacking or by some other means, an exact bit pattern of the vulnerable function within the product can be identified. The bit pattern represents a binary signature of the vulnerable section in the binary file, which is a component of a software product.

Once a security vulnerability is discovered and analyzed, a fix can be developed that will eliminate the vulnerability. Such fixes are called security patches and they represent revised code modules compiled into binary executables. Security patches can be installed on computers that are identified through the binary signature as running software that has the security vulnerability. Installation of the security patch will fix the security vulnerability. The distribution server 102 enables software product vendors and others to upload binary signatures of vulnerable binary files along with the security patches designed to fix the vulnerable binary files, into the database 202 for distribution.

Distribution module 200 is configured to distribute binary signatures and security patches from database 202 to various scan-patch servers 104 via a network 106. Distribution module 200 typically functions automatically to distribute binary signatures and security patches from database 202 whenever the database 202 is updated with additional signatures and patches. Automatic distribution may be achieved in a variety of ways including, for example, through communication from distribution module 200 to scan-patch servers 104 indicating that updated binary signatures and security patches are available and waiting for requests to send the binary signatures and security patches, or by automatically forwarding updated binary signatures and security patches to scan-patch servers 104 configured to accept the updates.

In the embodiment of FIG. 2, a scan-patch server 104 includes a scan-patch module 204 and a database 206 for receiving and holding binary signatures and security patches. Database 206 is typically updated automatically with new binary signatures and security patches through communications between the scan-patch module 204 and the distribution module 200 on distribution server 102. In addition to updating database 206 with binary signatures and security patches, scan-patch module 204 is configured to access client computer 108 and scan binary files 208 for binary signatures. Scanning binary files 208 can include searching for a binary signature in binary files present on any form of media present on or accessible by client computer 108. Binary files 208 typically include compiled, computer/processor-readable code such as an operating system or an application program file. However, it is noted that binary files 208 can be any form of binary information including computer/processor-readable instructions, data structures, program modules, and other data for client computer 108.

As noted below in the discussion referring to the exemplary computer environment of FIG. 7, such media on a client computer 108 can include any available media that is accessible by client computer 108, such as volatile and non-volatile media as well as removable and non-removable media. Such computer/processor-readable media can include volatile memory, such as random access memory (RAM) and/or non-volatile memory, such as read only memory (ROM). Computer/processor-readable media can also include other removable/non-removable, volatile/non-volatile computer storage media, such as, for example, a hard disk drive for reading from and writing to a non-removable, non-volatile magnetic media, a magnetic disk drive for reading from and writing to a removable, non-volatile magnetic disk (e.g., a "floppy disk"), an optical disk drive for reading from and/or writing to a removable, non-volatile optical disk such as a CD-ROM, DVD-ROM, or other optical media, other magnetic storage devices flash memory cards, electrically erasable programmable read-only memory (EEPROM), network-attached storage, and the like. All such computer/processor-readable media providing both volatile and non-volatile storage of any form of binary files 208, including computer/processor-readable instructions, data structures, program modules, and other data for client computer 108, is accessible for scanning by scan-patch server 104 via scan-patch module 204.

Scan-patch module 204 thus searches binary files 208 on client computer 108 to determine if a binary signature identifying a security vulnerability is present in any binary information located on client computer 108. If the bit pattern of the binary signature is found in a binary file 208, scan-patch module 204 operates to fix the security vulnerability in the binary file 208 by installing a corresponding security patch on client computer 108. Installation of a security patch on client computer 108 overwrites or otherwise eliminates the binary file or a portion of the binary file containing the security vulnerability.

Figure 3:
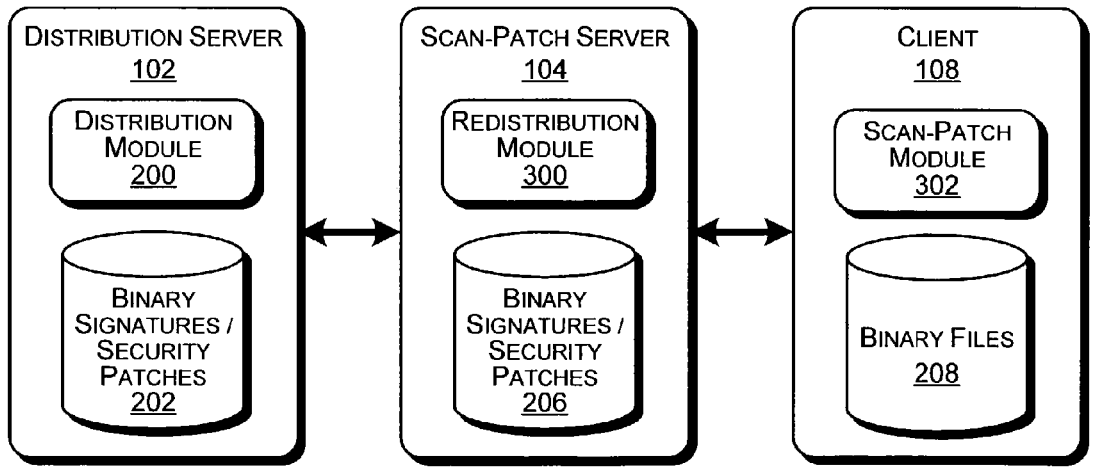
FIG. 3 illustrates another exemplary embodiment of a distribution server, a scan-patch server, and a client computer suitable for implementing automatic detection and patching of security vulnerabilities in binary files.

FIG. 3 illustrates another exemplary embodiment of a distribution server 102, a scan-patch server 104 and a client computer 108 suitable for implementing patching of security vulnerabilities in binary files. In general, in the FIG. 3 embodiment, binary signatures and security patches are pushed down, or redistributed, from the server 104 to the client computer 108, and the scanning for security vulnerable files and the patching of security vulnerable files is performed by the client computer 108 instead of the scan patch server 104.

In the FIG. 3 embodiment, distribution server 102 is configured in the same manner as discussed above with respect to the embodiment of FIG. 2. Thus, database 202 can be updated to include newly discovered binary signatures that identify security vulnerabilities in binary files. Database 202 can also be updated with corresponding security patches that have been developed to fix such security vulnerabilities.

The scan-patch server 102 of FIG. 3 is configured in somewhat the same manner as that discussed above with respect to FIG. 2. Thus, scan-patch server 102 of FIG. 3 includes a database 206 for receiving and holding binary signatures and security patches. Database 206 is typically updated automatically with new binary signatures and security patches through communications between the scan-patch server 104 and the distribution server 102. However, the communication between the scan-patch server 104 and the distribution server 102 is conducted through a redistribution module 300 instead of a scan-patch module 204 as discussed with respect to the FIG. 2 embodiment.

The redistribution module 300, in addition to updating database 206 with binary signatures and security patches, is configured to communicate with scan-patch module 302 on client computer 108 and transfer a binary signature to the client computer 108. Scan-patch module 302 is configured to receive the binary signature and to scan binary files 208 to determine if the binary signature is present in any binary information located on client computer 108. Thus, the scan-patch module 302 of FIG. 3 functions in a manner similar to the scan-patch module 204 discussed above with reference to FIG. 2.

If the bit pattern of the binary signature is found in a binary file 208 on client computer 108, scan-patch module 302 sends a request to the redistribution module 300 on server 102. The request is to have the redistribution module 300 send the security patch corresponding with the binary signature down to the client computer 108. The redistribution module 300 responds to the request by sending the appropriate security patch to client computer 108. The scan patch module 302 receives the security patch and operates to fix the security vulnerability in the binary file 208 by installing the security patch on client computer 108. As in the FIG. 2 embodiment, installation of a security patch on client computer 108 overwrites or otherwise eliminates the binary file or a portion of the binary file containing the discovered security vulnerability.

Exemplary Methods

Example methods for implementing automatic detection and patching of security vulnerabilities in binary files will now be described with primary reference to the flow diagrams of FIGS. 4-6. The methods apply generally to the exemplary embodiments discussed above with respect to FIGS. 1-3. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 4:
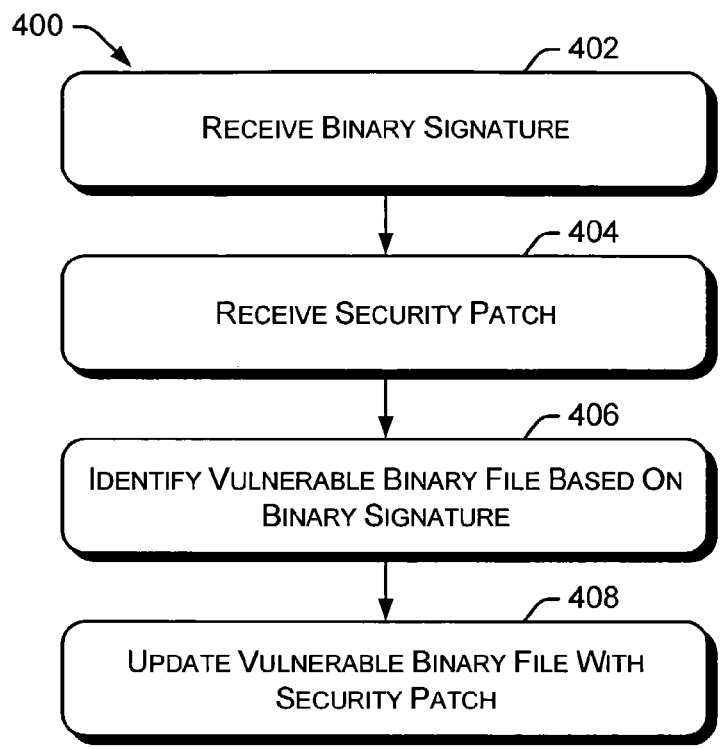
FIGS. 4-6 illustrate block diagrams of exemplary methods for implementing automatic detection and patching of security vulnerabilities in binary files.

FIG. 4 shows an exemplary method 400 for implementing automatic detection and patching of security vulnerabilities in binary files. The binary files are typically located or stored on a client computer being served by a server computer, but they may also be located on the server computer itself, or any other computing device accessible by the server computer. At block 402 of method 400, a binary signature is received. The binary signature is a bit pattern that has been associated with a security vulnerability in a particular binary file, such as an executable application program or operating system running on a client computer. The binary signature is received from a central distribution server 102 by a subordinate server 104.

At block 404, a security patch is received. The security patch is typically compiled executable code that has been developed as a fix to the security vulnerability of the particular binary file. The security patch is also received from the central distribution server 102 by the subordinate server 104. At block 406, a vulnerable binary file is identified based on the binary signature. The identification of the vulnerable binary file is typically achieved by scanning binary information stored on various media of a computer, such as client computer 108, and then comparing the pattern(s) in the binary signature with the binary information found on the media. The identification can happen in various ways including, for example, by the server 104 scanning and comparing all the binary information present on the client computer. The identification of a vulnerable binary file can also be achieved by having the server 104 push the binary signature down to the client computer so that the client computer can perform the scan and comparison.

At block 408 of method 400, the security patch is used to update the vulnerable binary file. The update can be achieved in various ways including, for example, by the server 104 installing the security patch on the client computer 108. If the client computer 108 has performed the scan and identified the vulnerable binary file, the client computer 108 may request that the server 104 send the security patch to the computer 108, in which case the computer 108 can install the security patch to fix the vulnerable binary file.

Figure 5:
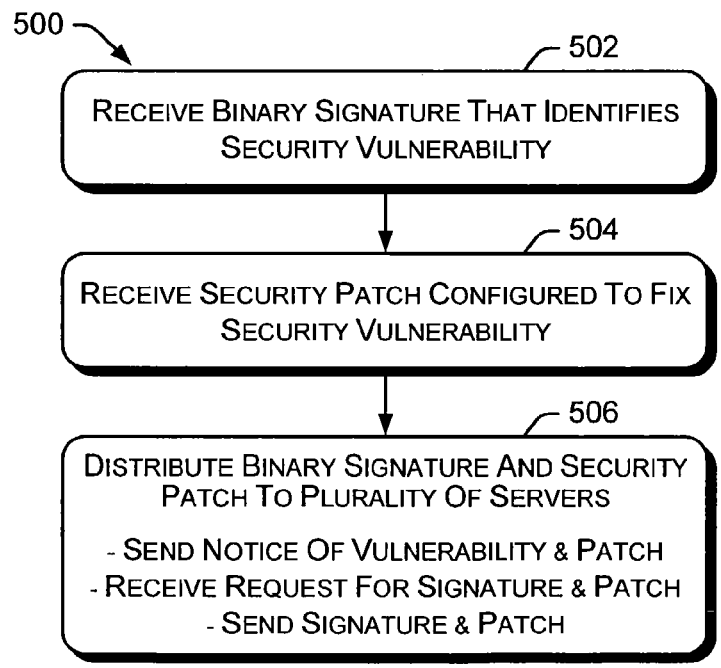

FIG. 5 shows another exemplary method 500 for implementing automatic detection and patching of security vulnerabilities in binary files. The method 500 generally illustrates the distribution of binary signatures for security vulnerabilities and the security patches developed for fixing those security vulnerabilities. At block 502 of method 500, a binary signature is received that identifies a security vulnerability of a binary file. The binary signature is typically uploaded to a distribution server 102 as a newly discovered bit pattern that identifies a vulnerability in a binary file of a software product that may be widely distributed across many computers on a network such as the Internet. The upload is typically achieved from a computer coupled to the distribution server 102 or from a portable storage medium inserted into the distribution server 102. At block 504, a security patch configured to fix the security vulnerability is received by the distribution server 102 in a similar manner as the binary signature.

At block 506, the binary signature and the security patch are distributed to a plurality of subordinate servers 104 from distribution server 102. This distribution occurs automatically and can be achieved in various ways. For example, upon receiving an uploaded binary signature and security patch, the distribution server 102 can automatically send the binary signature and security patch out over the network to all subordinate servers 104 configured to receive updated binary signatures and security patches. The distribution server 102 might also send a notice to servers 104 indicating that a security vulnerability has been discovered and that a security patch is available to fix the vulnerability. Subordinate servers 104 can then request that the distribution server 102 send the binary signature that identifies the security vulnerability and the security patch. Upon receiving a request, the distribution server 102 can forward the binary signature and the security patch to requesting servers 102.

Figure 6:
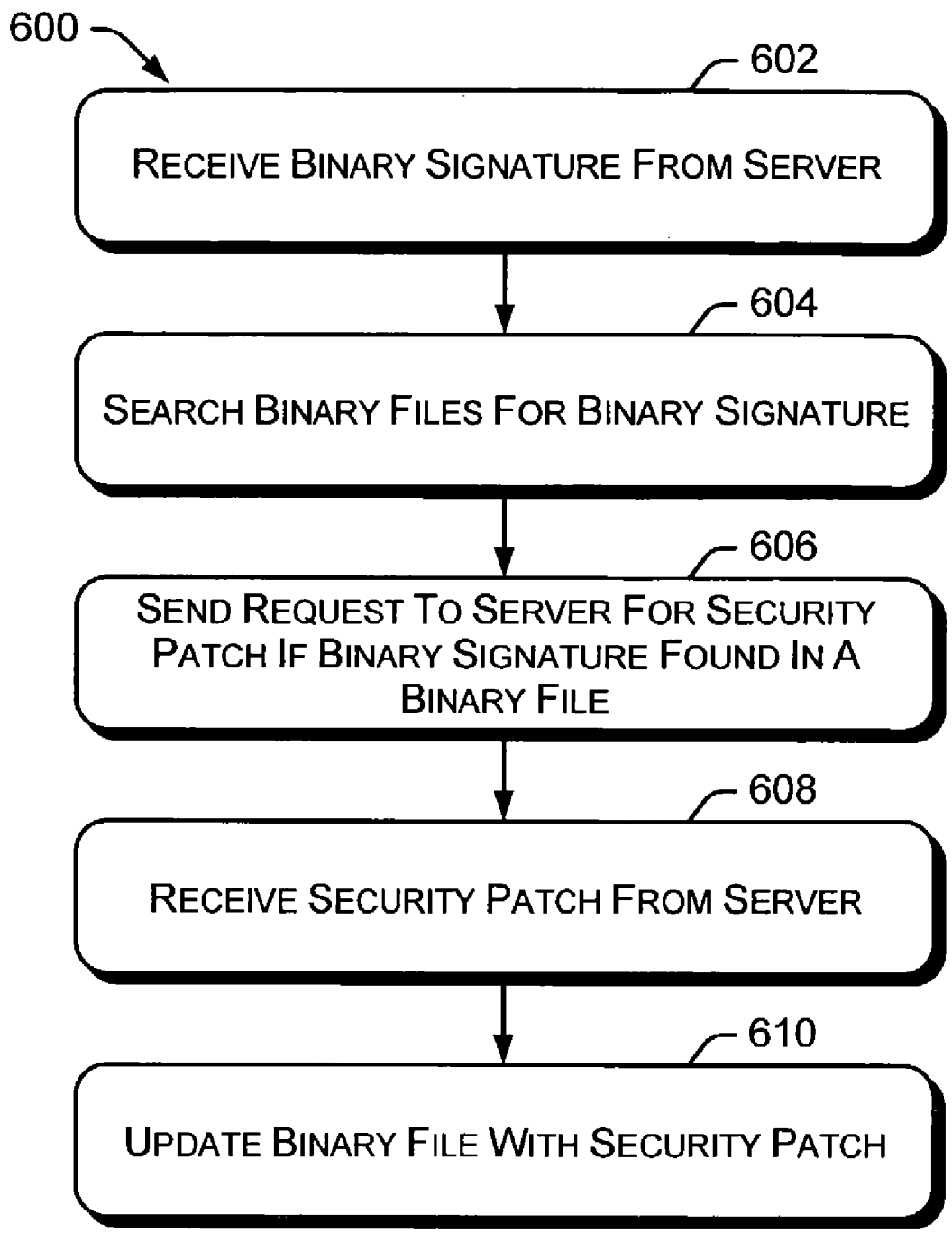

FIG. 6 shows another exemplary method 600 for implementing automatic detection and patching of security vulnerabilities in binary files. At block 602 of method 600, a client computer 108 receives a binary signature from a server 104. The binary signature is associated with a security vulnerability in a binary file that may be present on the client computer 108. At block 604, the client computer 108 scans all the binary information presently available to it and compares the pattern(s) in the binary signature with the binary information. The binary information scanned by the client computer 108 is typically in the form of computer/processor-readable and/or executable instructions, data structures, program modules, and other data useful for client computer 108, and can reside on both volatile and non-volatile storage media of various types.

At block 606, if the client computer 108 finds a binary file that contains the binary signature, it sends a request to the server 104 to have the security patch transferred. At block 608, the client computer 108 receives the security patch, and at block 610, the client computer 108 installs the security patch in order to fix the security-vulnerability in the binary file containing binary information matching the pattern(s) in the binary signature.

While one or more methods have been disclosed by means of flow diagrams and text associated with the blocks of the flow diagrams, it is to be understood that the blocks do not necessarily have to be performed in the order in which they were presented, and that an alternative order(s) may result in similar advantages. Furthermore, the methods are not exclusive and can be performed alone or in combination with one another.

Exemplary Computer

Figure 7:
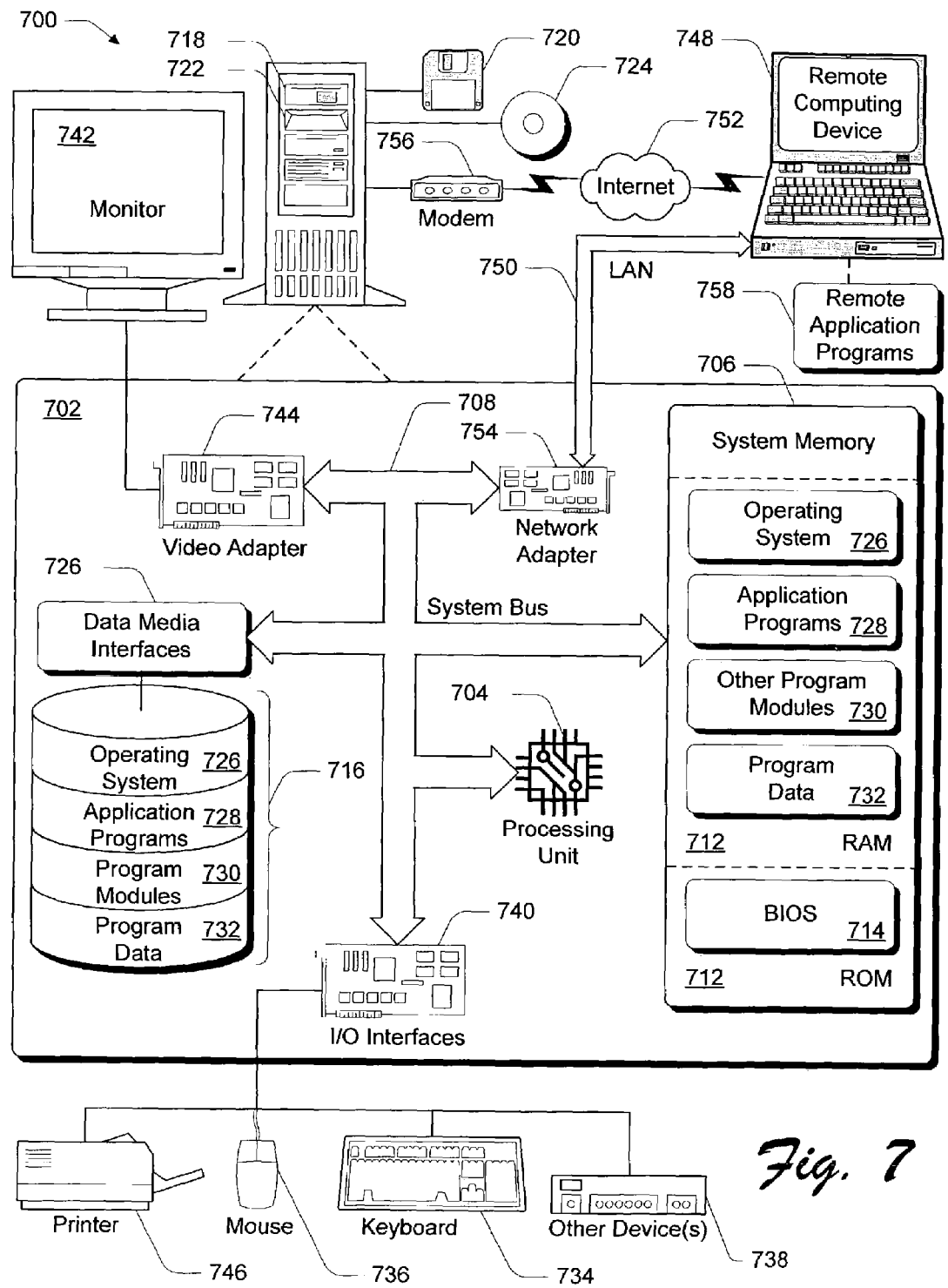
FIG. 7 illustrates an exemplary computing environment suitable for implementing a distribution server, a scan-patch server, and a client computer.

FIG. 7 illustrates an exemplary computing environment suitable for implementing a distribution server 102, a scan-patch server 104, and a client computer 108, as discussed above with reference to FIGS. 1-3. Although one specific configuration is shown in FIG. 7, distribution server 102, scan-patch server 104, and client computer 108 may be implemented in other computing configurations.

The computing environment 700 includes a general-purpose computing system in the form of a computer 702. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. An example of a system bus 708 would be a Peripheral Component Interconnects (PCI) bus, also known as a Mezzanine bus.

Computer 702 typically includes a variety of computer-readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer readable instructions, data structures, program modules, and other data for computer 702. Although then example illustrates a hard disk 716, a removable magnetic disk 720, and a removable optical disk 724 it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of a caching scheme for user network access information.

Computer 702 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer storage medium having a tangible component and comprising processor-executable instructions configured for:
   receiving a binary signature at a server computing device, the binary signature comprising a bit pattern that is associated with a security vulnerability in a particular binary file located on a client computing device;
   receiving a security patch at the server computing device;
   identifying, from the server computing device, the particular vulnerable binary file located on the client computing device based on the binary signature, the client computing device being remote from the server computing device;
   updating, from the server computing device, the particular vulnerable binary file located on the client computing device with the security patch; and
   wherein the identifying of the particular vulnerable binary file located on a client computing device comprises comparing the bit pattern that is associated with the security vulnerability in the particular vulnerable binary file against bit patterns of binary files located on the client computing device, and wherein the updating of the particular vulnerable binary file occurs if a bit pattern of the particular vulnerable binary file exactly matches the bit pattern of the binary signature that is associated with the security vulnerability.

2. A computer storage medium as recited in claim 1, wherein the updating the vulnerable binary file located on the client computing device includes installing the security patch on the client computing device from the server computing device.

3. A computer storage medium as recited in claim 1, wherein the receiving includes receiving the binary signature and the security patch from a distribution server configured to distribute to the client computing device, binary signatures that identify vulnerable files and security patches configured to fix the vulnerable files.

4. A server comprising the computer storage medium as recited in claim 1.

5. A computer storage medium having a tangible component and comprising processor-executable instructions configured for:
   receiving a binary signature that identifies a security vulnerability in a binary file, the binary signature comprising a bit pattern that is associated with a security vulnerability in a particular binary file located on one or more client computing devices;
   receiving a security patch configured to fix the security vulnerability in the binary file; and
   distributing the binary signature and the security patch to a plurality of servers to enable each respective server of the plurality of servers to:
      identify, from the respective server, the particular vulnerable binary file located on a respective client computing device based on the binary signature, the client computing device being remote from the respective server; and
      update, from the respective server, the particular vulnerable binary file located on the respective client computing device with the security patch;
      wherein the respective server identifies the particular vulnerable binary file located on the respective client computing device by comparing the bit pattern that is associated with the security vulnerability in the particular vulnerable binary file against bit patterns of binary files located on the respective client computing device, and wherein the respective server updates the particular vulnerable binary if a bit pattern of the particular vulnerable binary file exactly matches the bit pattern of the binary signature that is associated with the security vulnerability.

6. A computer storage medium as recited in claim 5, wherein the distributing includes:
   sending a notice to each of the plurality of servers regarding the security vulnerability and the available patch;
   receiving a request to send the binary signature and the security patch; and
   sending the binary signature and the security patch in response to request.

7. A distribution server comprising the computer storage medium as recited in claim 5.

8. A computer storage medium having a tangible component and comprising processor-executable instructions configured for:
   receiving a binary signature from a server, the binary signature comprising a bit pattern that is associated with a security vulnerability in a particular binary file;
   searching for the binary signature in binary files located on a client computer for the particular binary file;
   sending a request from the client computer to the server for a security patch if a binary file is found that includes the binary signature, wherein the particular binary file is found if a bit pattern of a binary file on the client computer exactly matches the bit pattern of the binary signature that is associated with the security vulnerability;
   receiving the security patch from the server; and
   updating on the client computer the binary file with the security patch.

9. A client computer comprising the computer storage medium as recited in claim 8.

10. A method comprising:
- receiving a binary signature from a server and at a client computer the binary signature comprising a bit pattern that is associated with a security vulnerability in a particular binary file;
- searching on the client computer for the particular vulnerable file based on the binary signature;
- if a vulnerable file is found on the client computer, requesting a security patch from the server, wherein the particular binary file is found if a bit pattern of a binary file on the client computer exactly matches the bit pattern of the binary signature that is associated with the security vulnerability;
- receiving the security patch from the server and at the client computer in response to the request for the security patch from the client computer; and
- fixing the vulnerable file with the security patch received from the server.

11. A method as recited in claim 10, wherein the fixing includes installing the security patch on the client computer.

12. A method as recited in claim 10, wherein the searching includes comparing the binary signature to binary information on a storage medium of the client computer.

13. A method as recited in claim 12, wherein the binary information is selected from a group comprising:
- an operating system;
- an application program file; and
- a data file.

14. A method as recited in claim 12, wherein the storage medium is selected from a group comprising:
- a hard disk;
- a magnetic floppy disk;
- an optical disk;
- a flash memory card;
- an electrically erasable programmable read-only memory; and
- network-attached storage.

15. A method comprising:
- receiving, at a scan/patch server, a binary signature and a security patch from a distribution server, the binary signature comprising a bit pattern that is associated with a security vulnerability in a particular binary file;
- searching, by the scan/patch server, on a client computer for the particular vulnerable binary file associated with the binary signature; and
- if the particular vulnerable binary file is found, fixing, by the scan/patch server, the particular vulnerable binary file on the client computer with the security patch, wherein the particular vulnerable binary file is found if a bit pattern of a binary file on the client computer exactly matches the bit pattern of the binary signature that is associated with the security vulnerability.

16. A computer comprising:
- means for receiving, at a client computer, a binary signature from a server, the binary signature comprising a bit pattern that is associated with a security vulnerability in a particular binary file;
- means for searching for the particular vulnerable binary file located on the client computer based on the binary signature;
- means for requesting, by the client computer, a security patch from the server if the particular vulnerable binary file is found on the client computer, wherein the particular vulnerable binary file is found if a bit pattern of a binary file on the client computer exactly matches the bit pattern of the binary signature that is associated with the security vulnerability;
- means for receiving the security patch from the server at the client computer responsive to the request for the securoty patch; and
- means for fixing the particular vulnerable binary file with the security patch received from the server.

17. A server comprising:
- means for receiving, at a scan/patch server, a binary signature and a security patch from a distribution server, the binary signature comprising a bit pattern that is associated with a security vulnerability in a particular binary file;
- means for scanning, from the scan/patch server, a client computer for the particular vulnerable binary file associated with the binary signature; and
- means for fixing, from the scan/patch server, the particular vulnerable binary file on the client computer with the security patch if the particular vulnerable binary file is found on the client computer, wherein the particular vulnerable binary file is found if a bit pattern of a binary file on the client computer exactly matches the bit pattern of the binary signature that is associated with the security vulnerability.

18. A computer having a tangible component and comprising:
- binary information;
- a storage medium configured to retain the binary information;
- a scan module configured to receive a binary signature from a server and scan the binary information on the computer for the binary signature, the binary signature comprising a bit pattern that is associated with a security vulnerability in a particular binary file; and
- a patch module configured to request a security patch from a server and install the security patch from the server if the binary signature is found in the binary information on the computer, wherein the binary signature is found if a bit pattern of a binary file of the binary information on the client computer exactly matches the bit pattern of the binary signature that is associated with the security vulnerability.

19. A computer as recited in claim 18, wherein the binary information is selected from a group comprising:
- an operating system;
- an application program file; and
- a data file.

20. A computer having a tangible component and comprising:
- binary files;
- a storage medium configured to retain the binary files;
- a binary signature; and
- a security patch module configured to receive the binary signature from a server and to scan the binary files on the computer in search of the binary signature, the binary signature comprising a bit pattern that is associated with a security vulnerability in a particular binary file;
- the particular binary file that includes the binary signature; and
- a security patch;
- wherein the security patch module is further configured to request the security patch from the server upon locating the binary signature within the binary file, and to apply the security patch to the binary file that includes the binary signature, wherein the binary signature is found if a bit pattern of a binary file of the binary files on the computer exactly matches the bit pattern of the binary signature that is associated with the security vulnerability.

21. A distribution server having a tangible component and comprising:

a database; and a distribution module configured to receive a binary signature and a security patch, store the binary signature and the security patch in the database, and distribute the binary signature and the security patch to a plurality of servers, the binary signature comprising a bit pattern that is associated with a security vulnerability in a particular binary file located on one or more client computers, wherein the distributing of the binary signature to the plurality of servers enables each respective server of the plurality of servers to:

identify, from the respective server, the particular vulnerable binary file located on a respective client computer based on the binary signature, the client computer being remote from the respective server; and update, from the respective server, the particular vulnerable binary file located on the respective client computer with the security patch;

wherein the respective server identifies the particular vulnerable binary file located on the respective client computer by comparing the bit pattern that is associated with the security vulnerability in the particular vulnerable binary file against bit patterns of binary files located on the respective client computer, and wherein the respective server updates the particular vulnerable binary if a bit pattern of the particular vulnerable binary file exactly matches the bit pattern of the binary signature that is associated with the security vulnerability.

22. A distribution server as recited in claim 21, wherein the distribution module is further configured to receive a request from a server for the binary signature and the security patch and to distribute the binary signature and the security patch to the server in response to the request.

23. A server having a tangible component and comprising:

a binary signature comprising a bit pattern that is associated with a security vulnerability in a particular binary file;

a security patch configured to fix the security vulnerability in the binary file;

a database embodied as a storage medium and configured to store the binary signature and the security patch; and a scan module configured to scan, from the server, binary files on a client computer for the binary signature and to update, from the server, the binary file on the client computer with the security patch if the binary signature is found, wherein the client computer is remote from the server, wherein the binary signature is found if a bit pattern of a binary file of the binary files on the computer exactly matches the bit pattern of the binary signature that is associated with the security vulnerability.

24. A server as recited in claim 23, wherein the scan module is further configured to receive the binary signature and the security patch from a distribution server and to store the binary signature and the security patch in the database.

\* \* \* \* \*

UNITED STATES PATENT AND TRADEMARK OFFICE
CERTIFICATE OF CORRECTION

PATENT NO.         : 7,424,706 B2
APPLICATION NO.    : 10/621148
DATED              : September 9, 2008
INVENTOR(S)        : Ivanov et al.

It is certified that error appears in the above-identified patent and that said Letters Patent is hereby corrected as shown below:

In column 12, line 44, in Claim 6, delete "to" and insert -- to the --, therefor.

In column 13, line 3, in Claim 10, delete "computer" and insert -- computer, --, therefor.

In column 14, line 3, in Claim 16, delete "securoty" and insert -- security --, therefor.

Signed and Sealed this
Twenty-sixth Day of April, 2011

David J. Kappos
*Director of the United States Patent and Trademark Office*